United States Patent
Matsumoto et al.

(10) Patent No.: US 7,482,405 B2
(45) Date of Patent: Jan. 27, 2009

(54) CEMENT ADDITIVE

(75) Inventors: Toshimi Matsumoto, Kanagawa (JP); Sven Asmus, Shanghai (CN); Gerhard Albrecht, Tacherting (DE); Klaus Lorenz, Zangberg (DE); Petra Wagner, Trostberg (DE); Christian Scholz, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/551,268

(22) PCT Filed: Mar. 5, 2004

(86) PCT No.: PCT/EP2004/002254

§ 371 (c)(1),
(2), (4) Date: Jun. 13, 2006

(87) PCT Pub. No.: WO2004/087602

PCT Pub. Date: Oct. 14, 2004

(65) Prior Publication Data

US 2006/0247402 A1 Nov. 2, 2006

(30) Foreign Application Priority Data

Apr. 3, 2003 (JP) ............................. 2003-100709

(51) Int. Cl.
*C08L 35/00* (2006.01)
*C08L 33/02* (2006.01)
*C08L 33/08* (2006.01)

(52) U.S. Cl. .................. 525/207; 525/221; 525/222; 525/223; 525/227; 525/228; 525/231; 106/823

(58) Field of Classification Search ................ 526/271, 526/317.1, 318.2, 318.4, 318.5, 319, 321, 526/329.6, 332, 333; 106/823; 525/207, 525/221, 222, 223, 227, 228, 231

See application file for complete search history.

(56) References Cited

U.S. PATENT DOCUMENTS

| 5,798,425 | A  * | 8/1998 | Albrecht et al. ............. 526/271 |
| 6,762,220 | B1 * | 7/2004 | Yaguchi et al. ................. 524/5 |
| 6,777,517 | B1 * | 8/2004 | Albrecht et al. .......... 526/317.1 |
| 6,911,494 | B2 * | 6/2005 | Yamashita et al. .......... 524/556 |

FOREIGN PATENT DOCUMENTS

| DE | 199 26 611 A | 12/2000 |
| EP | 1 052 232 A | 11/2000 |
| WO | WO 01/58579 A | 8/2001 |
| WO | WO 02/096823 A | 12/2002 |

* cited by examiner

*Primary Examiner*—Helen L. Pezzuto
(74) *Attorney, Agent, or Firm*—Curatolo Sidoti Co., LPA; Joseph G. Curatolo; Peter R. Detorre

(57) ABSTRACT

The present invention concerns a cement additive containing copolymers comprising one or more constitutional units represented by formula A: (A) $R_1$ is hydrogen, an alkyl group having 1 to 4 carbon atoms, an alkenyl group having 1 to 4 carbon atoms or an aryl group having 6 to 9 carbon atoms; R2 is hydrogen or an alkyl group having 1 to 9 carbon atoms, an alkenyl group having 1 to 9 carbon atoms or an aryl group having 6 to 9 carbon atoms; T is alkylene (including straight-chain and branched alkylene) having 1 to 4 carbon atoms or arylene having 6 to 9 carbon atoms; n is 0 or 1; $S_1$ and $S_2$ are, independently of one another, $-OC_kH_{2k}-$ or $-OCH_2CHR_3-$, with the proviso that k is 2 or 3, R3 is an alkyl group having 1 to 9 carbon atoms, an aryl group having 6 to 9 carbon atoms; and $6 < m_1 + m_2 < 25$.

15 Claims, No Drawings

CEMENT ADDITIVE

CROSS REFERENCE TO RELATED APPLICATIONS

This application is a national stage application of International Application No. PCT/EP2004/002254, filed Mar. 5, 2004, which claims the benefit of Application No. JP 2003-100709, filed Apr. 3, 2003, from which applications priority is claimed.

TECHNICAL FIELD OF THE INVENTION

The present invention relates to all types of concrete admixtures used with the aim of improving the workability of cement compositions.

BACKGROUND ART

Water reducing agents are widely used with the aim of improving the quality of cement compositions such as concrete, mortar, etc. Naphthalenesulfonate-formalin condensates, melaminesulfonate-formalin condensates, ligninsulfonates, polycarboxylic acids, etc. are generally used as water reducing agents. Among these, the demand for polycarboxylic acid type water reducing agents, developed in recent years, is continually increasing because they have better water reducing properties than other water reducing agents.

When looking at developments up to this day, polycarboxylic acid type water reducing agents can be roughly divided into dispersion type water reducing agents which aim at the water reducing effect and slump maintaining type water reducing agents which aim at preventing slump loss.

In the early days of polycarboxylic acid type water reducing agent development, when the attention was on the dispersion type water reducing agents, the use of copolymers of unsaturated dicarboxylic acids or unsaturated monocarboxylic acids not having a polyalkylene-oxide group etc. has been proposed (refer for example to Documents 1 and 2). However, the slump loss preventing properties of these agents are of course insufficient, and even their water reducing properties are inadequate. Thereafter, polycarboxylic acid type water reducing agents for cement which have a polyalkylene oxide group and improved water reducing properties such as copolymers of polyethylene glycol methacrylate and methacrylic acid (refer for example to Document 3) and copolymers of polyethylene glycol methacrylate, methacrylic acid and amide compound adducts having polyalkylene oxides of unsaturated carboxylic acid (refer for example to Document 4) etc. were developed and widely used instead of those mentioned above. However, even though these dispersion type polycarboxylic acid water reducing agents for cement have better water reducing properties than the previous water reducing agents without a polyalkylene oxide group, their slump loss preventing effect is still not adequate.

On the other hand, together with progress in concrete technology, the requirements for the slump loss preventing effect in concrete also increased and the development of the slump maintaining type of polycarboxylic acids progressed. E.g., copolymers of polyethylene glycol methacrylate and methacrylic acid (refer for example to Document 5); copolymers selected from polyalkylene glycol diester monomers having unsaturated bonds, acrylate monomers and polyalkylene glycol monoester monomers having unsaturated bonds (refer for example to Document 6); copolymers of methacrylic acid and polyethylene glycol methacrylate whose oxyethylene group has 1 to 10 and 11 to 100 different chain lengths (refer for example to Document 7); copolymers of polyoxyalkylene derivatives and maleic anhydrides (refer for example to Document 8); copolymers of polyoxyalkylene derivatives and maleic anhydrides (refer for example to Document 9); copolymers of alkenyl ethers and maleic anhydrides (refer for example to Document 10); copolymers of olefins having 2 to 8 carbon atoms and ethylenic unsaturated dicarboxylic acid anhydrides (refer for example to Document 11) and metal complexes of copolymers etc. of olefins having 2 to 8 carbon atoms and ethylenic unsaturated dicarboxylic acids and of polyacrylic acids (refer for example to Document 12) etc. have been proposed; and the slump loss preventing effect, which is insufficient with dispersion type water reducing agents, has been improved by using slump maintaining agents in combination with the dispersion type polycarboxylic acid water reducing agents mentioned above (refer for example to Document 13).

Many inventions, like those mentioned above, are effective for improving water reducing properties, dispersion properties and slump loss preventing properties by means of polycarboxylic acid water reducing agents.

Nowadays, however, attention at concrete work site is not focused on single properties such as water reducing properties, dispersion properties or slump maintaining properties; but what, in the end, is urgently needed is a cement additive for achieving excellent working properties and workability and for realizing excellent economical efficiency during the whole work process.

Development at present, however, has stopped at improving specific properties of cement compositions.

Document 1: JP-B-02-16264
Document 2: JP-B-03-36774
Document 3: JP-B-59-18338
Document 4: JP-B-02-7897
Document 5: JP-B-06-104585
Document 6: JP-A-05-238795
Document 7: JP-A-09-286645
Document 8: Japanese Patent No.2541218
Document 9: JP-A-07-215746
Document 10: JP-A-05-310458
Document 11: Japanese Patent No. 2933994
Document 12: JP-A-62-83344
Document 13: Japanese Patent No.2741631

PROBLEMS TO BE SOLVED BY THE INVENTION

Consequently, it is an object of the present invention to solve the problems of the prior art and to provide a cement additive for achieving excellent working properties and workability and for simultaneously fulfilling requirements of water reducing properties, dispersion properties and slump maintaining properties at a high level.

MEANS FOR SOLVING THE PROBLEM

As a result of extensive research to solve the above-mentioned problems, the inventors of the present invention, considering that it is indispensable to simultaneously fulfill, at a high level, requirements of water reducing properties, dispersion properties and slump maintaining properties in order to achieve a superior and stable workability, found that, independent of variations in the handling conditions such as concrete temperature, water/cement ratio etc., high water reducing properties, excellent dispersion properties and very high mixing speeds, excellent flow properties and slump preventing effect can be achieved in a stable manner through the whole process from mixing to placing by using copolymers comprising specific constitutional units, and then have completed the invention.

Therefore, the present invention relates to a cement additive containing copolymers comprising one or more constitutional units represented by formula A:

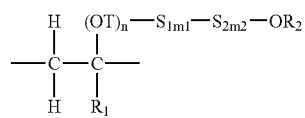

(A)

wherein $R_1$ is hydrogen, an alkyl group having 1 to 4 carbon atoms, an alkenyl group having 1 to 4 carbon atoms or an aryl group having 6 to 9 carbon atoms;

$R_2$ is hydrogen or an alkyl group having 1 to 9 carbon atoms, an alkenyl group having 1 to 9 carbon atoms or an aryl group having 6 to 9 carbon atoms;

T is alkylene (straight-chain and branched alkylene) having 1 to 4 carbon atoms or arylene having 6 to 9 carbon atoms;

n is 0 or 1;

$S_1$ and $S_2$ are, independently of one another, $-OC_kH_{2k}-$ or $-OCH_2CHR_3-$, with the proviso that k is 2 or 3, $R_3$ is an alkyl group having 1 to 9 carbon atoms, an aryl group having 6 to 9 carbon atoms; and $6 \leq m_1 + m_2 \leq 25$;

one or more constitutional units represented by formula B:

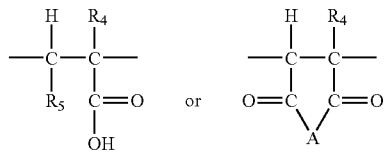

(B)

wherein $R_4$ is hydrogen or a methyl group;

$R_5$ is hydrogen or a group represented by COOY;

Y is hydrogen, an aliphatic hydrocarbon group (including straight-chain, branched, saturated and unsaturated groups) having 1 to 8 carbon atoms, a cyclic hydrocarbon group (including straight-chain, branched, saturated and unsaturated groups) having 3 to 8 carbon atoms, a hydroxyalkyl group (including branched groups) having 2 to 5 carbon atoms, a hydroxyalkenyl group having 2 to 5 carbon atoms, metal (oxidation number I or II), an ammonium group derived from alkylamine having 1 to 20 carbon atoms, alkanolamine having 1 to 20 carbon atoms, cycloalkylamine having 5 to 8 carbon atoms, arylamine having 6 to 14 carbon atoms;

A is oxygen or $NR_6$; and $R_6$ is hydrogen, an alkyl group having 1 to 20 carbon atoms, an aryl group having 6 to 20 carbon atoms, a sulfonyl group or a sulfanyl group; and one or more constitutional units represented by formula C:

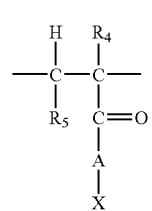

(C)

wherein

R4, R5 and A have the same meaning as in formula B;

X is an aliphatic hydrocarbon group (including straight-chain, branched, saturated and unsaturated groups) having 1 to 8 carbon atoms, a cyclic hydrocarbon group (including straight-chain, branched, saturated and unsaturated groups) having 3 to 8 carbon atoms, a hydroxyalkyl group (including branched groups) having 2 to 5 carbon atoms, a hydroxyalkenyl group having 2 to 5 carbon atoms, metal (oxidation number I or II), an ammonium group derived from alkylamine having 1 to 20 carbon atoms, alkanolamine having 1 to 20 carbon atoms, cycloalkylamine having 5 to 8 carbon atoms, arylamine having 6 to 14 carbon atoms.

The present invention further relates to the before-mentioned cement additive wherein the average molecular weight of the copolymers is 5,000 to 50,000.

The present invention also relates to the before-mentioned cement additive comprising copolymers wherein the mole ratio of the constitutional units A and C is $A/C \geq 0.1$ and the mole ratio of the constitutional units B and C is $B/C \leq 20$.

The present invention further relates to the before-mentioned cement additive having slump retaining properties and comprising copolymers wherein the mole ratio of the constitutional units A and C is $0.1 \leq A/C \leq 1$ and the mole ratio of the constitutional units B and C is $B/C \leq 1$.

The present invention also relates to the before-mentioned cement additive having dispersing properties and comprising copolymers wherein the mole ratio of the constitutional units A and C is $A/C > 1$ and the mole ratio of the constitutional units B and C is $1 < B/C \leq 20$.

The present invention further relates to the before-mentioned cement additive comprising copolymers wherein the mole ratio of the constitutional units A and C is $0.1 \leq A/C \leq 1$ and the mole ratio of the constitutional units B and C is $B/C \leq 1$, and copolymers wherein the mole ratio of the constitutional units A and C is $A/C > 1$ and the mole ratio of the constitutional units B and C is $1 < B/C \leq 20$.

The present invention also relates to the before-mentioned cement additive comprising copolymers wherein the mole ratio of the constitutional units A and C is $0.1 \leq A/C \leq 1$ and the mole ratio of the constitutional units B and C is $B/C \leq 1$, and copolymers wherein the mole ratio of the constitutional units A and C is $A/C > 1$ and the mole ratio of the constitutional units B and C is $1 < B/C \leq 20$ in a ratio of 20:80 to 99:1.

The present invention further relates to the before-mentioned cement additive further comprising one or more of additive I selected from the group consisting of polycarboxylic acid type copolymers comprising vinyl alcohol; polycarboxylic acid type copolymers; co-polymers of alkyl vinyl ether and acrylic acid derivatives; copolymers of hydroxyalkyl vinyl ether and acrylic acid derivatives; copolymers of vinyl alcohol derivatives and acrylic acid derivatives; copolymers of vinyl ether, acrylic acid and maleic acid; copolymers of allyl ether and maleic anhydride; copolymers of allyl ether, maleic anhydride and maleic acid ether; co-polymers of methacrylate alkylene oxide ether and methacrylic acid; copolymers of methacrylate alkylene oxide ether and acrylic acid; maleic acid esters; copolymers of maleic acid and styrene; ligninsulfonic acid; polymelaminesulfonic acid; bisnaphthalenesulfonic acid and gluconic acid.

The present invention also relates to the before-mentioned cement additive comprising cement additive I and copolymers wherein the mole ratio of the constitutional units A and C is $0.1 \leq A/C \leq 1$ and the mole ratio of the constitutional units B and C is $B/C \leq 1$; wherein cement additive I is comprised in a ratio of 1 to 60 wt % of the total amount of cement additives.

The present invention further relates to the before-mentioned cement additive comprising cement additive I and copolymers wherein the mole ratio of the constitutional units A and C is $A/C > 1$ and the mole ratio of the constitutional units B and C is $1 < B/C \leq 20$; wherein cement additive I is 50 wt % or more of the total amount of cement additives.

The present invention also relates to the before-mentioned cement additive comprising cement additive I, copolymers wherein the mole ratio of the constitutional units A and C is $0.1 \leq A/C \leq 1$ and the mole ratio of the constitutional units B and C is $B/C \leq 1$, and copolymers wherein the mole ratio of the constitutional units A and C is $A/C > 1$ and the mole ratio of the constitutional units B and C is $1 < B/C \leq 20$; wherein cement additive I is comprised in a ratio of 1 to 99 wt % of the total amount of cement additives.

The present invention further relates to the before-mentioned cement additive further comprising one or more of cement additive II selected from the group consisting of gluconic acid, sodium gluconate, saccharides, sugar alcohols, lignin, polycarboxylic acid, polyamide, polyamine, polyethoxyethylene, triethanolamine, commonly used air-entraining agents, polysaccharide derivatives, lignin derivatives, dry shrinkage reducing agents, accelerators, retarding agents, foaming agents, defoaming agents, rust preventing agents, quick setting agents, thickeners and water-soluble high molecular substances.

The present invention also relates to the before-mentioned cement additive wherein cement additive II is 40 wt % or less of the total amount of cement additives.

The cement additive according to the present invention, by using copolymers constituted by specific constitutional units, provides excellent water reducing properties, dispersion properties and slump preventing properties and realizes excellent working properties and workability.

By further comprising two or more types of specific constitutional units at a specific ratio, the cement additive according to the present invention simultaneously and reliably provides dispersion properties and slump maintaining properties.

The effect of different types of copolymers on the properties of concrete is generally explained by the DLVO theory and by the steric repulsion theory. Based on these theories, ideas have been proposed that specialize for example on the improvement of slump loss preventing properties by mixing copolymers with excellent dispersion properties with two or more types of copolymers with excellent slump maintaining properties. Developing these ideas still further, the present invention, based on the copolymer structure, the elements constituting said copolymers and the intramolecular ratios of the constitutional elements as well as on the mixing ratios of the specific copolymers by which these properties can be achieved, provides excellent water reducing properties, dispersion properties and slump maintaining properties and achieves excellent working properties and workability for a wide range of concrete manufacturing conditions.

Moreover, the cement additive according to the present invention, due to its excellent adaptability, can achieve excellent properties not only in general building construction applications but also in ultrahigh strength concrete applications, spray concrete applications and concrete products (including medium/high flow concrete products, ultra high strength concrete products, heat-cured concrete products, centrifugally cast concrete products etc.).

DETAILED DESCRIPTION OF PREFERRED EMBODIMENTS

The copolymers used in the present invention are constituted by the constitutional units represented by formulae A, B and C below as indispensable units.

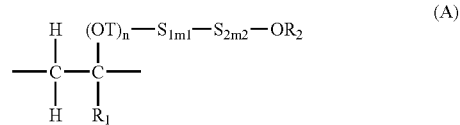

with the proviso that $R_1$ is hydrogen, an alkyl group having 1 to 4 carbon atoms such as methyl, etc., an alkenyl group having 1 to 4 carbon atoms such as allyl, or an aryl group having 6 to 9 carbon atoms;

$R_2$ is hydrogen or an alkyl group having 1 to 9 carbon atoms, an alkenyl group having 1 to 9 carbon atoms or an aryl group having 6 to 9 carbon atoms;

T is alkylene (straight-chain and branched alkylene) having 1 to 4 carbon atoms such as methylene, ethylene, propylene, butylene, etc., or arylene having 6 to 9 carbon atoms;

n is 0 or 1;

$S_1$ and $S_2$ are, independently of one another, $-OC_kH_{2k}-$ or $-OCH_2CHR_3-$, with the proviso that k is 2 or 3, $R_3$ is an alkyl group having 1 to 9 carbon atoms, an aryl group having 6 to 9 carbon atoms; and $6 \leq m_1 + m_2 \leq 25$.

Formula B is

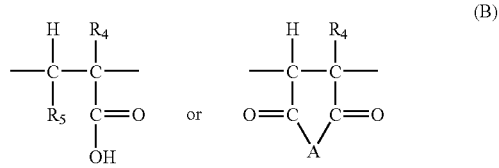

with the proviso that $R_4$ is hydrogen or a methyl group;

$R_5$ is hydrogen or a group represented by COOY;

Y is hydrogen, an aliphatic hydrocarbon group (including straight-chain, branched, saturated or unsaturated groups) having 1 to 8 carbon atoms, a cyclic hydrocarbon group (including straight-chain, branched, saturated or unsaturated groups) having 3 to 8 carbon atoms, a hydroxyalkyl group (including branched groups) having 2 to 5 carbon atoms, a hydroxyalkenyl group having 2 to 5 carbon atoms, metal (oxidation number I or II), an ammonium group derived from alkylamine having 1 to 20 carbon atoms, alkanolamine having 1 to 20 carbon atoms, cycloalkylamine having 5 to 8 carbon atoms, arylamine having 6 to 14 carbon atoms;

A is oxygen or $NR_6$; and $R_6$ is hydrogen, an alkyl group having 1 to 20 carbon atoms, an aryl group having 6 to 20 carbon atoms, a sulfonyl group or a sulfanyl group.

Formula C is

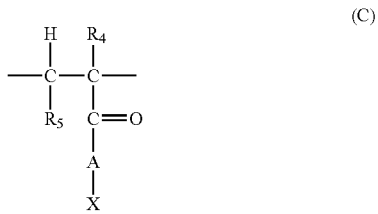

(C)

with the proviso that

R4, R5 and A have the same meaning as in formula B;

X is an aliphatic hydrocarbon group (including straight-chain, branched, saturated and unsaturated groups) having 1 to 8 carbon atoms, a cyclic hydrocarbon group (including straight-chain, branched, saturated and unsaturated groups) having 3 to 8 carbon atoms, a hydroxyalkyl group (including branched groups) having 2 to 5 carbon atoms, a hydroxyalkenyl group having 2 to 5 carbon atoms, metal (oxidation number I or II), an ammonium group derived from alkylamine having 1 to 20 carbon atoms, alkanolamine having 1 to 20 carbon atoms, cycloalkylamine having 5 to 8 carbon atoms, arylamine having 6 to 14 carbon atoms.

Moreover, in the present invention, these copolymers can include, as constitutional unit, one or more types of monomer selected from among monomers that can be copolymerized with the constitutional units A, B and C, in a range in which the desired properties are not lost.

Example of monomers that can be copolymerized include unsaturated monocarboxylic acid derivatives such as polyethylene glycol mono(meth)acrylate, polypropylene glycol (meth)acrylate, polybutylene glycol (meth)acrylate, polyethylene glycol polypropylene glycol mono(meth)acrylate, polyethylene glycol polybutylene glycol mono(meth)acrylate, polypropylene glycol polybutylene glycol mono(meth)acrylate, polyethylene glycol polypropylene glycol polybutylene glycol mono(meth)acrylate, methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, ethoxypolyethylene glycol polypropylene glycol polybutylene glycol mono(meth)acrylate, etc.;

allyl alcohol acid derivatives such as polyethylene glycol mono(meth)allyl ether, polypropylene glycol mono(meth)allyl ether, polybutylene glycol mono(meth)allyl ether, polyethylene glycol polypropylene glycol mono(meth)allyl ether, polyethylene glycol polybutylene glycol mono(meth)allyl ether, polypropylene glycol polybutylene glycol mono(meth) allyl ether, polyethylene glycol polypropylene glycol polybutylene glycol mono(meth)allyl ether, methoxypolyethylene glycol mono(meth)allyl ether, methoxypolypropylene glycol mono(meth)allyl ether, methoxypolybutylene glycol mono(meth)allyl ether, methoxypolyethylene glycol polypropylene glycol mono(meth)allyl ether, methoxypolyethylene glycol polybutylene glycol mono(meth)allyl ether, methoxypolypropylene glycol polybutylene glycol mono (meth)allyl ether, methoxypolyethylene glycol polypropylene glycol polybutylene glycol mono(meth)allyl ether, ethoxypolyethylene glycol mono(meth)allyl ether, ethoxypolypropylene glycol mono(meth)allyl ether, ethoxypolybutylene glycol mono(meth)allyl ether, ethoxypolyethylene glycol polypropylene glycol mono(meth)allyl ether, ethoxypolyethylene glycol polybutylene glycol mono(meth)allyl ether, ethoxypolypropylene glycol polybutylene glycol mono (meth)allyl ether, ethoxypolyethylene glycol polypropylene glycol polybutylene glycol mono(meth)allyl ether, etc.;

crotyl alcohol acid derivatives such as polyethylene glycol mono(metha)crotyl ether, polypropylene glycol mono(metha)crotyl ether, polybutylene glycol mono(metha)crotyl ether, polyethylene glycol polypropylene glycol mono(metha)crotyl ether, polyethylene glycol polybutylene glycol mono(metha)crotyl ether, polypropylene glycol polybutylene glycol mono(metha)crotyl ether, polyethylene glycol polypropylene glycol polybutylene glycol mono(metha)crotyl ether, methoxypolyethylene glycol mono(metha)crotyl ether, methoxypolypropylene glycol mono(metha)crotyl ether, methoxypolybutylene glycol mono(metha)crotyl ether, methoxypolyethylene glycol polypropylene glycol mono(metha)crotyl ether, methoxypolyethylene glycol polybutylene glycol mono(metha)crotyl ether, methoxypolypropylene glycol polybutylene glycol mono(metha)crotyl ether, methoxypolyethylene glycol polypropylene glycol polybutylene glycol mono(metha)crotyl ether, ethoxypolyethylene glycol mono(metha)crotyl ether, ethoxypolypropylene glycol mono (metha)crotyl ether, ethoxypolybutylene glycol mono (metha)crotyl ether, ethoxypolyethylene glycol polypropylene glycol mono(metha)crotyl ether, ethoxypolyethylene glycol polybutylene glycol mono(metha)crotyl ether, ethoxypolypropylene glycol polybutylene glycol mono(metha)crotyl ether, ethoxypolyethylene glycol polypropylene glycol polybutylene glycol mono(metha)crotyl ether, etc.;

diesters of unsaturated dicarboxylic acids such as maleic acid, fumaric acid, citraconic acid, etc. and aliphatic alcohols having 1 to 20 carbon atoms or glycol having 2 to 4 carbon atoms or polyalkylene glycol having 2 to 100 mols of these glycols; aromatic vinyls such as styrene etc.; unsaturated sulfonic acids such as (meth)allyl sulfonic acid, sulfoethyl (meth)acrylate, 2-methylpropane sulfonic acid (meth)acrylamide, styrene sulfonic acid and their monovalent salts, divalent salts, ammonium salts and organic amine salts; unsaturated hydrocarbons having 2 to 20 carbon atoms such as ethylene, propylene, 1-butene, 2-butene, isobutylene, n-pentene, isoprene, 2-methyl-1-butene, n-hexane, 2-methyl-1-pentene, 3-methyl-1-pentene, 4-methyl-1-pentene, 2-ethyl-1-butene, diisobutylene, 1,3-butadiene, 1,3-hexadiene, 1,3-octadiene, 2-methyl4-dimethyl-1-pentene, 2-methyl-4-dimethyl-2-pentene, etc.

Constitutional unit A is used to incorporate an alkylene oxide chain or a similar structure into the copolymer structure. It can be said that the alkylene oxide chain mainly has an influence on the dispersions properties; in the present invention, the most preferred dispersion properties are obtained when $m_1+m_2$ from $S_1$ and $S_2$ of the alkylene oxide chain in constitutional unit A is 6 to 25. Moreover, the preferred molecular weight is 5,000 to 50,000.

Preferred specific examples of constitutional unit A include polyethylene glycol monovinyl ether (molecular weight 300), polyethylene glycol monovinyl ether (molecular weight 500), polyethylene glycol monovinyl ether (molecular weight 750), polyethylene glycol monovinyl ether (molecular weight 1,000), methylpolyethylene glycol monovinyl ether (molecular weight 300), methylpolyethylene glycol monovinyl ether (molecular weight 500), methylpolyethylene glycol monovinyl ether (molecular weight 750), methylpolyethylene glycol monovinyl ether (molecular weight 1,000), etc.

It can be considered that the structure and the amount of constitutional unit B mainly have an influence on the slump maintaining properties of cement compositions. It is possible to obtain copolymers for achieving excellent slump maintaining properties by incorporating constitutional unit B having a suitable structure at a specific amount into the structure of the copolymer.

Preferred specific examples of constitutional unit B include methacrylic acid, maleic acid anhydride, maleic acid, acrylic acid, etc.

It can be considered that, in the copolymers, constitutional unit C has the role of maintaining the cement composition in a good state. This constitutional unit, which plays a very important role for achieving excellent workability, keeps the cement and the aggregates well blended and maintains an appropriate degree of viscosity and flow properties even if the water/cement ratio in the cement composition and the temperature change and time passes, and is one of the most characteristic features of the present invention.

Preferred specific examples of constitutional unit C include methyl (meth)acrylate, ethyl (meth)acrylate, isobutyl (meth)acrylate, n-butyl (meth)acrylate, hydroxypropyl (meth)acrylate, hydroxyethyl (meth)acrylate, maleic acid dibutyl ester, methyl (meth)acrylate.

Constitutional units A, B and C are important elements in that each shows a different effect in the copolymers.

Thus, the three constitutional units are indispensable.

In the copolymers used in the present invention, it is preferred that the mole ratio of the constitutional units A and C is $A/C \geq 0.1$ and the mole ratio of the constitutional units B and C is $B/C \leq 20$.

Among these, copolymers wherein the mole ratio of the constitutional units A and C is $0.1 \leq A/C \leq 1$ and the mole ratio of the constitutional units B and C is $B/C \leq 1$ are preferably used as slump maintaining agents because, when used as cement additive, they have slump maintaining properties.

Moreover, copolymers wherein the mole ratio of the constitutional units A and C is $A/C > 1$ and the mole ratio of the constitutional units B and C is $1 < B/C \leq 20$ are preferably used as dispersing agents because, when used as cement additive, they have dispersion properties.

Consequently, by using a cement additive comprising both copolymers wherein the mole ratio of the constitutional units A and C is $0.1 \leq A/C \leq 1$ and the mole ratio of the constitutional units B and C is $B/C \leq 1$, and copolymers wherein the mole ratio of the constitutional units A and C is $A/C > 1$ and the mole ratio of the constitutional units B and C is $1 < B/C \leq 20$ it is possible to simultaneously and reliably achieve slump maintaining properties and dispersion properties.

In this case it is preferred to include copolymers wherein the mole ratio of the constitutional units A and C is $0.1 \leq A/C \leq 1$ and the mole ratio of the constitutional units B and C is $B/C \leq 1$, and copolymers wherein the mole ratio of the constitutional units A and C is $A/C > 1$ and the mole ratio of the constitutional units B and C is $1 < B/C \leq 20$ in a ratio of 20:80 to 99:1; while a ratio of 50:50 to 80:20 is even more preferred.

The cement additive according to the present invention may further include one or more of additive I selected from the group consisting of polycarboxylic acid type copolymers comprising vinyl alcohol; polycarboxylic acid type copolymers; copolymers of alkyl vinyl ether and acrylic acid derivatives; copolymers of hydroxyalkyl vinyl ether and acrylic acid derivatives; copolymers of vinyl alcohol derivatives and acrylic acid derivatives; copolymers of vinyl ether, acrylic acid and maleic acid; copolymers of allyl ether and maleic anhydride; copolymers of allyl ether, maleic anhydride and maleic acid esters; copolymers of methacrylate polyalkylene oxide esters and methacrylic acid; copolymers of maleic acid esters, maleic acid and styrene; ligninsulfonic acid salts; polymelaminesulfonic acid salts; bisnaphthalenesulfonic acid salts and gluconic acid salts.

Cement additives having the above-mentioned slump maintaining properties, when comprising cement additive I and copolymers wherein the mole ratio of the constitutional units A and C is $0.1 \leq A/C \leq 1$ and the mole ratio of the constitutional units B and C is $B/C \leq 1$, preferably comprise cement additive I in a ratio of 1 to 60 wt % of the total amount of cement additives.

Cement additives having the above-mentioned dispersion properties, when comprising cement additive I and copolymers wherein the mole ratio of the constitutional units A and C is $A/C > 1$ and the mole ratio of the constitutional units B and C is $1 < B/C \leq 20$, preferably comprise cement additive I in a ratio of 50 wt % or more of the total amount of cement additives.

When blended copolymers having the above-mentioned slump maintaining properties and dispersion properties are used, it is preferred to use cement additive I in a ratio of 1 to 99 wt % of the total amount of cement additives.

The cement additive according to the present invention may further include one or more of cement additive II selected from the group consisting of gluconic acid, sodium gluconate, saccharides, sugar alcohols, lignin, polycarboxylic acid, polyamide, polyamine, polyamide polyamine, polyethoxyethylene, triethanolamine, commonly used air-entraining agents, polysaccharide derivatives, lignin derivatives, dry shrinkage reducing agents, accelerators, retarding agents, foaming agents, defoaming agents, rust preventing agents, quick setting agents, thickeners and water-soluble high molecular substances.

In this case, it is preferred to use cement additive II in a ratio of 40 wt % or less of the total amount of cement additives.

EXAMPLES

Examples of the cement additive according to the present invention will be given; however, the present invention is not limited by these embodiments.

(Synthesis)

Prescribed amounts of water and monomers for obtaining constitutional unit A were introduced into a reaction vessel equipped with a thermometer, a stirrer, a reflux condenser and two inlets. While stirring and controlling the temperature so that it normally was 30° C. or less, prescribed amounts of hydrogen peroxide, iron sulfate and 3-mercaptopropionic acid or similar polymerization catalysts were introduced.

Monomers for obtaining constitutional unit B and monomers for obtaining constitutional unit C or a mixed solution of these monomers to which one or more monomers selected from a group consisting of other monomers had been added and which had been prepared in a separate vessel at a prescribed ratio were introduced into the reaction solution at a prescribed speed.

After a prescribed reaction time, an aqueous solution of caustic soda was introduced to terminate the reaction.

The monomers and copolymers used in the present invention are shown in Tables 1 and 2 respectively.

(Table 1)

TABLE 1

Copolymers and the ratio of the constitutional unit elements (monomers)

| Co-polymer | Monomer | | | | Monomer ratio (mole ratio) | | | |
|---|---|---|---|---|---|---|---|---|
| | A | B(I) | B(II) | C(I) | C(II) | A/C | B/C | B(I)/B(II) | C(I)/C(II) |
| P1 | A-1 | B-1 | B-2 | C-2 | | 0.8 | 0.7 | 3.0 | |
| P2 | A-2 | B-1 | | C-2 | | 0.6 | 0.9 | | |
| P3 | A-2 | B-1 | | C-1 | C-2 | 0.6 | 0.9 | | 0.3 |
| P4 | A-2 | B-1 | | C-3 | C-2 | 0.4 | 0.6 | | 1.0 |
| P5 | A-3 | B-1 | | C-2 | | 1.0 | 1.0 | | |
| P6 | A-2 | B-1 | | C-2 | | 1.0 | 1.0 | | |
| P7 | A-3 | B-1 | | C-2 | | 1.3 | 2.8 | | |
| P8 | A-4 | B-1 | B-2 | C-2 | | 2.5 | 5.3 | 20.0 | |
| P9 | A-2 | B-1 | | C-2 | | 5.0 | 6.0 | | |
| P10 | A-2 | B-1 | | C-4 | | 10.0 | 12.0 | | |
| P11 | A-2 | B-1 | | C-1 | | 5.0 | 6.0 | | |
| P12 | A-4 | B-1 | B-2 | C-5 | | 10.0 | 20.0 | 10.0 | |
| P13 | A-4 | B-1 | B-2 | — | — | | | 10.0 | |
| P14 | A-5 | B-1 | B-2 | — | — | | | 10 | |

TABLE 2

Types of monomers

| Monomer A | A-1 | Monovinyl ether (molecular weight 300) |
| | A-2 | Monovinyl ether (molecular weight 500) |
| | A-3 | Monovinyl ether (molecular weight 750) |
| | A-4 | Monovinyl ether (molecular weight 1,100) |
| | A-5 | Monovinyl ether (molecular weight 5,800) |
| Monomer B | B-1 | Acrylic acid |
| | B-2 | Maleic acid anhydride |
| Monomer C | C-1 | Methyl acrylate |
| | C-2 | Hydroxypropyl acrylate |
| | C-3 | Hydroxypropyl methacrylate |
| | C-4 | Hydroxyethyl acrylate |
| | C-5 | Maleic acid dibutyl ester |

The copolymers obtained and the combinations with additive I and additive II are shown in Table 3.

(Table 3)

TABLE 3

| | Mixtures | | | | |
|---|---|---|---|---|---|
| Mixture | Copolymer I | Copolymer II | Additive I | Additive II | Mixing ratio |
| 1 | P1 | P8 | — | | 30/70 |
| 2 | P3 | P11 | P14 | | 15/70/15 |
| 3 | P6 | P7 | | | 70/30 |
| 4 | P5 | P10 | | | 30/70 |
| 5 | P5 | P7 | PA | | 50/30/20 |
| 6 | P4 | P6 | PB | | 20/50/30 |
| 7 | P2 | P9 | P12 | Triethanol amine | 10/25/65 |
| 8 | P2 | P9 | P12 | Gluconic acid | 47/32/20/1 |
| 9 | P2 | P9 | P12 | Triethanol amine | 20/15/65 |
| 10 | P13 | P14 | | | 15/85 |

PA: Polycarboxylic acid type copolymers comprising vinyl alcohol
PB: Polycarboxylic acid type copolymers In order to evaluate the cement additive according to the present invention, concrete was prepared with the prescribed mixtures at the concrete temperature and with the different water/cement ratios given below, and the ability of maintaining good workability was judged by comparing the difference in the state of the concrete and of the values for slump and slump flow of the concrete directly after its preparation and after having left the concrete to rest for 60 minutes.

(Concrete Mixing and Mixtures)

Concrete having a target slump of 20±1.0 cm and a target air amount of 4.5%±0.5% at a water/cement ratio of 45% and a target slump flow of 45±2.5 cm and a target air amount of 3.0%±0.5% at a water/cement ratio of 35% was prepared with the standard mixtures according to the specifications of this company.

The concrete was prepared by weighing each material so as to obtain a mixed amount of 80 liters, introducing all the materials into a 100 liter pan-type forced mixer and mixing them for 120 seconds.

(Materials Used)
Cement: Normal Portland cement with a density of 3.16 g/cm$^3$ of Taiheiyo Cement Corporation.
Fine aggregate: Oigawa river sand with a density of 2.59 g/cm$^3$
Coarse aggregate: Crushed stones from Ome with a density of 2.65 g/cm$^3$
Slump measurement: according to JIS A-1101

(Evaluation of Changes in the Slump Values)
The difference between the slump directly after preparing the concrete and the slump after having left the concrete to rest for 60 minutes was:
a: less than 3.0 cm,
b: 3.0 cm or more but less than 6.0 cm,
c: 6.0 cm or more.

(Evaluation of Changes in the Slump Flow Values)
The difference between the slump flow directly after preparing the concrete and the slump flow after having left the concrete to rest for 60 minutes was:
a: less than 5.0 cm,
b: 5.0 cm or more but less than 10.0 cm,
c: 10.0 cm or more.

(Evaluation of Changes in the State of the Concrete)
Regarding concrete directly after preparation and concrete having been left to rest for 5, 15, 30 and 60 minutes, the ease of mixing, the flow properties, the cementing of mortar and aggregate, the appearance during slumping and the shape after slumping were observed and evaluated in three grades: a, b and c.

(Overall Evaluation)
Based on the evaluation of the changes in slump, in slump flow and in the state of the concrete, the overall evaluation was made in three grades: a, b and c, and the evaluation results for the Examples are shown in Table 4.

(Table 4)

TABLE 4

Evaluation results 1 of the Examples

| | Mixture | Water/cement ratio (%) | Amount of additive (%) | Temperature (° C.) | Slump difference | Slump flow difference | State | Overall Evaluation |
|---|---|---|---|---|---|---|---|---|
| Example 1 | 1 | 45 | 0.7 | 20 | b | a | a | b-a |
| Example 2 | 2 | 45 | 0.85 | 20 | b | a | a | b-a |
| Example 3 | 3 | 45 | 0.7 | 20 | a | a | a | a |
| Example 4 | 4 | 45 | 0.85 | 20 | b | a | a | b-a |
| Example 5 | 5 | 45 | 0.85 | 20 | a | a | a | a |
| Example 6 | 6 | 45 | 0.8 | 20 | b | a | a | b-a |
| Example 7 | 7 | 45 | 0.7 | 20 | b | a | a | b-a |
| Example 8 | 8 | 45 | 1.2 | 30 | b | b | a | b-a |
| Example 9 | 9 | 35 | 1.2 | 20 | — | a | a | a |
| Comp. Ex. 1 | 10 | 45 | 0.6 | 20 | b | b | b | b |
| Comp. Ex. 2 | — | 45 | 0.9 | 30 | c | c | c | c |
| Comp. Ex. 3 | — | 35 | 1.45 | 20 | — | c | c | c |

Comparative Examples 2 and 3: Company P, polycarboxylic acid ether high performance AE water-reducing agent Comparative Examples 2 and 3: Company P, polycarboxylic acid ether high performance AE water-reducing agent Compared to the Comparative Examples, the cement additive according to the present invention simultaneously achieved dispersion properties and slump maintaining properties and good workability.

(Mixing Time)

The mixing time is the time from the start of the mixing until the end of the mixing determined by visual observation of the mixing state of the concrete.

(Table 5)

TABLE 5

Evaluation results 2 of the Examples

| | Mixture | Water/cement ratio (%) | Amount of additive (%) | Temperature (° C.) | Mixing time (sec.) |
|---|---|---|---|---|---|
| Example 10 | 9 | 45 | 0.95 | 12 | 11 |
| Example 11 | 7 | 45 | 1.0 | 12 | 11 |
| Example 12 | 9 | 35 | 0.95 | 12 | 17 |
| Example 13 | 7 | 35 | 1.0 | 12 | 18 |
| Comp. Ex. 4 | | 45 | 0.9 | 12 | 18 |
| Comp. Ex. 5 | | 35 | 0.95 | 12 | 30 |

Comparative Examples 4 and 5: Company P, polycarboxylic acid ether high performance AE water-reducing agent Comparative Examples 4 and 5: Company P, polycarboxylic acid ether high performance AE water-reducing agent Compared with the Comparative Examples, Examples 10 and 11, which have the same water/cement ratio as Comparative Example 4, and Examples 12 and 13, which have the same water/cement ratio as Comparative Example 5, have far shorter mixing times, which makes it possible to reduce the manufacturing times of concrete.

The invention claimed is:

1. A cement additive containing copolyrners comprising one or more constitutional units represented by formula A:

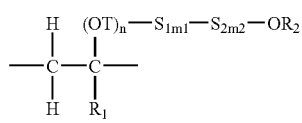

(A)

wherein

R$_1$ is hydrogen, an alkyl group having 1 to 4 carbon atoms, an alkenyl group having 1 to 4 carbon atoms or an aryl group having 6 to 9 carbon atoms;

R$_2$ is hydrogen or an alkyl group having 1 to 9 carbon atoms, an alkenyl group having 1 to 9 carbon atoms or an aryl group having 6 to 9 carbon atoms;

T is alkylene having 1 to 4 carbon atoms, wherein the alkylene may include straight-chain alkylene or branched alkylene or arylene having 6 to 9 carbon atoms;

n is 0 or 1;

S$_1$ and S$_2$ are, independently of one another, —OC$_k$H$_{2k}$— or —OCH$_2$CHR$_3$—, wherein k is 2 or 3, R$_3$ is an alkyl group having 1 to 9 carbon atoms, an aryl group having 6 to 9 carbon atoms; and $6 \leq m_1 + m_2 \leq 25$;

and one or more constitutional units represented by formula B:

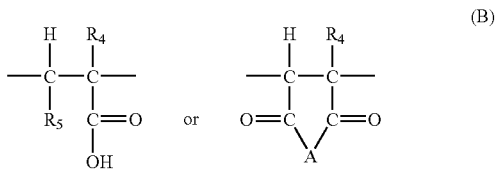

(B)

wherein

R$_4$ is hydrogen or a methyl group;

R$_5$ is hydrogen or a group represented by COOY;

Y is hydrogen, an aliphatic hydrocarbon group having 1 to 8 carbon atoms, wherein the aliphatic hydrocarbon group may include straight-chain, branched, saturated or unsaturated groups, a cyclic hydrocarbon group having 3 to 8 carbon atoms, wherein the cyclic hydrocarbon group may include straight-chain, branched, saturated or unsaturated groups, a hydroxyalkyl group having 2 to 5 carbon atoms, wherein the hydroxyalkyl group may include branched groups, a hydroxyalkenyl group having 2 to 5 carbon atoms, alkali metal or alkaline earth metal, an ammonium group derived from alkylamine having 1 to 20 carbon atoms, alkanolarmine having 1 to 20 carbon atoms, cycloalkylamine having 5 to 8 carbon atoms, or arylamine having 6 to 14 carbon atoms;

A is oxygen or NR$_6$; and

R$_6$ is hydrogen, an alkyl group having 1 to 20 carbon atoms, an aryl group having 6 to 20 carbon atoms, a sulfonyl group or a sulfanyl group; and one or more constitutional units represented by formula C:

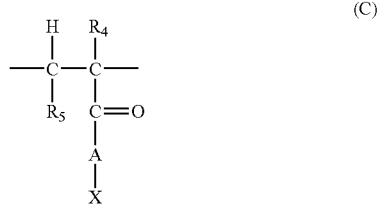

(C)

wherein

R$_4$ is hydrogen or a methyl group;

R$_5$ is hydrogen or a group represented by COOY;

A is oxygen or NR$_6$;

X is an aliphatic hydrocarbon group having 1 to 8 carbon atoms, wherein the aliphatic hydrocarbon group may include straight-chain, branched, saturated or unsaturated groups, a cyclic hydrocarbon group having 3 to 8 carbon atoms, wherein the cyclic hydrocarbon group may include straight-chain, branched, saturated or unsaturated groups, a hydroxyalkyl group having 2 to 5 carbon atoms, wherein the hydroxyalkyl group may include branched groups, a hydroxyalkenyl group having 2 to 5 carbon atoms, alkali metal or alkaline earth metal, an ammonium group derived from alkylamine having 1 to 20 carbon atoms, alkanolamine having 1 to 20 carbon atoms, cycloalkylamine having 5 to 8 carbon atoms, or arylamine having 6 to 14 carbon atoms;

and wherein the cement additive comprises copolymers wherein the mole ratio of the constitutional units A and C is 0.1≦A/C≦1 and the mole ratio of the constitutional units B and C is B/C≦1 and copolymers wherein the mole ratio of the constitutional units A and C is A/C>1 and the mole ratio of the constitutional units B and C is 1<B/C≦20.

2. The cement additive according to claim 1 wherein the weight average molecular weight of the copolymers is 5,000 to 50,000.

3. The cement additive according to claim 1 comprising copolymers wherein the mole ratio of the constitutional units A and C is 0.1≦A/C≦1 and the mole ratio of the constitutional units B and C is B/C≦1, and copolymers wherein the mole ratio of the constitutional units A and C is A/C>1 and the mole ratio of the constitutional tinits B and C is 1<B/C≦20 in a ratio of 20:80 to 99:1.

4. The cement additive according to claim 1 further comprising one or more of additive I selected from the group consisting of copolymers comprising vinyl alcohol; polycarboxylic acid type copolymers; copolymers of alkyl vinyl ether and acrylic acid derivatives; copolymers of hydroxyalkyl vinyl ether and acrylic acid derivatives; copolymers of vinyl alcohol derivatives and acrylic acid derivatives; copolymers of vinyl ether, acrylic acid and maleic acid; copolymers of allyl ether and maleic anhydride; copolymers of allyl ether, maleic anhydride and maleic acid ether; copolymers of methacrylate alkylene oxide ether and methacrylic acid; copolymers of methacrylate alkylene oxide ether and acrylic acid; maleic acid esters; copolymers of inaleic acid and styrene; ligninsulfonic acid; polymelaminesulfonic acid; bis-naphthalenesulfonic acid and gluconic acid.

5. The cement additive according to claim 4 comprising cement additive I, copolymers wherein the mole ratio of the constitutional units A and C is 0.1≦A/C≦1 and the mole ratio of the constitutional units B and C is B/C≦1, and copolymers wherein the mole ratio of the constitutional units A and C is A/C>1 and the mole ratio of the constitutional units B and C is 1<B/C≦20; wherein cement additive I is comprised in a ratio of 1 to 99 wt % of the total amount of cement additives.

6. The cement additive according to claim 1 further comprising one or more of cement additive II selected from the group consisting of gluconic acid, sodium gluconate, saccharides, sugar alcohols, lignin, polycarboxylic acid, polyamide, polyamine, polyethoxyethylene, triethanolamine, polysaceharide derivatives, and lignin derivatives.

7. The cement additive according to claim 6 wherein cement additive II is 40 wt % or less of the total amount of cement additives.

8. The cement additive according to claim 1 further comprising at least one of air entraining agents, dry shrinkage reducing agents, accelerators, retarding agents, foaming agents, defoaming agents, rust preventing agents, quick setting agents, thickeners or water-soluble high molecular substances.

9. The cement additive according to claim 4 further comprising one or more of cement additive II selected from the group consisting of gluconic acid, sodium gluconate, saccharides, sugar alcohols, lignin, polycarboxylic acid, polyaniide, polyamine, polyethoxyethylcne, triethanolamine, polysaceharide derivatives, and lignin derivatives.

10. The cement additive according to claim 4 further comprising at least one of air entraining agents, dry shrinkage reducing agents, accelerators, retarding agents, foaming agents, defoaming agents, rust preventing agents, quick setting agents, thickeners or water-soluble high molecular substances.

11. The cement additive according to claim 1 wherein the copolymer further comprises a monomer that is at least one of unsaturated monocarboxylic acid derivatives, allyl alcohol acid derivatives, crotyl alcohol acid derivatives, or diesters of unsaturated dicarboxylic acids.

12. The cement additive of claim 1 wherein the copolymer comprises a constitutional unit A that is at least one of polyethylene glycol monovinyl ether or methylpolyethylene glycol monovinyl ether.

13. The cement additive according to claim 1 wherein the copolymer comprises a constitutional unit B that is at least one of methacrylic acid, maleic acid anhydride, maleic acid or acrylic acid.

14. The cement additive according to claim 1 wherein the copolymer comprises a constitutional unit C that is at least one of methyl (meth)acrylate, ethyl (meth)acrylate, isobutyl (meth)acrylate, n-butyl (meth)acrylate, hydroxypropyl (meth)acrylate, hydroxyethyl (meth)acrylate, or maleic acid dibutyl ester.

15. The cement additive according to claim 1 comprising copolymers wherein the mole ratio of the constitutional units A and C is $0.1 \leq A/C \leq 1$ and the mole ratio of the constitutional units B and C is $B/C \leq 1$, and copolymers wherein the mole ratio of the constitutional units A and C is $A/C>1$ and the mole ratio of the constitutional units B and C is $1<B/C \leq 20$ in a ratio of 50:50 to 80:20.

* * * * *